US011679686B2

(12) United States Patent
Hassler et al.

(10) Patent No.: US 11,679,686 B2
(45) Date of Patent: Jun. 20, 2023

(54) METHOD FOR CHECKING A PRIMARY OR SECONDARY UNIT OF AN INDUCTIVE CHARGING SYSTEM

(71) Applicant: Bayerische Motoren Werke Aktiengesellschaft, Munich (DE)

(72) Inventors: Marius Hassler, Eching (DE); Josef Krammer, Holzkirchen (DE); Florian Niedermeier, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/850,297

(22) Filed: Jun. 27, 2022

(65) Prior Publication Data
US 2022/0324339 A1 Oct. 13, 2022

Related U.S. Application Data

(60) Division of application No. 16/535,903, filed on Aug. 8, 2019, now Pat. No. 11,479,131, and a continuation
(Continued)

(30) Foreign Application Priority Data

Feb. 9, 2017 (DE) .................... 10 2017 202 025.3

(51) Int. Cl.
*B60L 53/122* (2019.01)
*H04B 17/24* (2015.01)
(Continued)

(52) U.S. Cl.
CPC ........... *B60L 53/122* (2019.02); *B60L 53/126* (2019.02); *H02J 7/00* (2013.01); *H02J 50/12* (2016.02); *H02J 50/80* (2016.02); *H04B 17/24* (2015.01)

(58) Field of Classification Search
CPC ........ B60L 53/122; B60L 53/126; H02J 7/00; H02J 7/025; H02J 50/12; H02J 50/80;
(Continued)

(56) References Cited

U.S. PATENT DOCUMENTS

2011/0181123 A1* 7/2011 Ichikawa ................ B60L 53/62
307/104
2012/0235506 A1 9/2012 Kallal et al.
(Continued)

FOREIGN PATENT DOCUMENTS

DE 10 2009 033 237 A1 1/2011
DE 10 2012 210 930 A1 1/2014
(Continued)

OTHER PUBLICATIONS

PCT/EP2018/051863, International Search Report dated May 3, 2018 (Two (2) pages).
(Continued)

*Primary Examiner* — Pinping Sun
(74) *Attorney, Agent, or Firm* — Crowell & Moring LLP

(57) ABSTRACT

A method for checking a test secondary unit of an inductive test charging system for charging an electrical energy store, wherein the test charging system comprises the test secondary unit having a test secondary coil and a reference primary unit having a reference primary coil, includes recording a plurality of actual primary unit impedance values of the test charging system at the reference primary coil for a corresponding plurality of test combinations of values of operating parameters of the test charging system. The method also includes comparing the plurality of actual primary unit impedance values with a reference value range for a primary unit impedance.

3 Claims, 5 Drawing Sheets

Related U.S. Application Data of application No. PCT/EP2018/051863, filed on Jan. 25, 2018.

(51) Int. Cl.
*H02J 50/80* (2016.01)
*H02J 50/12* (2016.01)
*H02J 7/00* (2006.01)
*B60L 53/126* (2019.01)

(58) Field of Classification Search
CPC ..... H04B 17/24; Y02T 10/70; Y02T 10/7072; Y02T 90/14
See application file for complete search history.

(56) References Cited

U.S. PATENT DOCUMENTS

| | | | |
|---|---|---|---|
| 2012/0265475 A1 | 10/2012 | Gray et al. | |
| 2013/0257370 A1* | 10/2013 | Ichikawa | B60L 53/36 320/108 |
| 2015/0194814 A1* | 7/2015 | Taylor | H04B 5/0087 307/104 |
| 2015/0244341 A1* | 8/2015 | Ritter | H02M 3/33523 307/104 |
| 2016/0103191 A1* | 4/2016 | Von Novak, III | H04B 5/0037 324/244 |
| 2016/0216301 A1* | 7/2016 | Holzworth | H02J 50/12 |
| 2016/0233725 A1* | 8/2016 | Yoon | H02J 50/12 |
| 2017/0018977 A1 | 1/2017 | Van Wageningen et al. | |
| 2017/0163101 A1* | 6/2017 | Muratov | H02J 50/12 |
| 2019/0312459 A1* | 10/2019 | Garbus | H02J 50/80 |

FOREIGN PATENT DOCUMENTS

| | | |
|---|---|---|
| DE | 10 2016 104 905 A1 | 10/2016 |
| DE | 102015209810 A1 * | 12/2016 |
| DE | 10 2015 223 230 A1 | 5/2017 |
| WO | WO 2016/053616 A1 | 4/2016 |

OTHER PUBLICATIONS

German Search Report issued in German counterpart application No. 10 2017 202 025.3 dated Oct. 30, 2017, with Statement of Relevancy (Eight (8) pages).

* cited by examiner

METHOD FOR CHECKING A PRIMARY OR SECONDARY UNIT OF AN INDUCTIVE CHARGING SYSTEM

CROSS REFERENCE TO RELATED APPLICATIONS

This application is a divisional of U.S. patent application Ser. No. 16/535,903, filed Aug. 8, 2019, which is a continuation of PCT International Application No. PCT/EP2018/051863, filed Jan. 25, 2018, which claims priority under 35 U.S.C. § 119 from German Patent Application No. 10 2017 202 025.3, filed Feb. 9, 2017, the entire disclosures of which are herein expressly incorporated by reference.

BACKGROUND AND SUMMARY OF THE INVENTION

The invention relates to a method and to an evaluation unit for checking a primary unit and/or a secondary unit of an inductive coupling system for the inductive charging of the energy store of a vehicle.

Vehicles having an electric drive typically have a battery (that is to say an electrical energy store) in which electrical energy is able to be stored in order to operate an electric machine of the vehicle. The battery of the vehicle is able to be charged with electrical energy from a power supply grid. For this purpose, the battery is coupled to the power supply grid in order to transfer the electrical energy from the power supply grid into the battery of the vehicle. The coupling may take place in a wired manner (via a charging cable) and/or wirelessly (by way of inductive coupling between a charging station and the vehicle).

One approach for the automatic, wireless, inductive charging of the battery of the vehicle is that of transferring electrical energy to the battery from the ground to the underbody of the vehicle by way of magnetic induction across the underbody clearance. This is illustrated by way of example in FIG. 1. FIG. 1 in particular shows a vehicle 100 having an energy store 103 for electrical energy (for example having a rechargeable battery 103). The vehicle 100 comprises a secondary coil 121 in the vehicle underbody, the secondary coil 121 being connected to the store 103 for electrical energy via impedance matching, not shown, and a rectifier 101. The secondary coil 121 is typically part of what is known as a "wireless power transfer" (WPT) vehicle unit 120 or secondary unit 120.

The secondary coil 121 of the WPT vehicle unit 120 is able to be positioned above a primary coil 111, the primary coil 111 being installed for example on the floor of a garage. The primary coil 111 is typically part of what is known as a WPT base unit 110 or primary unit 110. The primary coil 111 is connected to a power supply 113. The power supply 113 may comprise a radiofrequency generator or inverter that generates an AC (alternating current) current in the primary coil of the WPT base unit 110 (this current also being referred to as primary current in this document), as a result of which a magnetic field (in particular a magnetic charging field) is induced. The magnetic charging field may have a frequency from a predefined charging field frequency range. The charging field frequency of the electromagnetic charging field may be situated in the range from 80-90 kHz (in particular at 85 kHz).

When there is sufficient magnetic coupling between the primary coil 111 of the WPT base unit 110 and the secondary coil 121 of the WPT vehicle unit 120 across the underbody clearance 130, a corresponding voltage, and therefore also a current, is induced in the secondary coil 121 by the magnetic field (this current also being referred to as secondary current in this document). The induced current in the secondary coil 121 of the WPT vehicle unit 120 is rectified by the rectifier 101 and stored in the store 103. Electrical energy is thus able to be transferred wirelessly from the power supply 113 to the energy store 103 of the vehicle 100. The charging procedure is able to be controlled in the vehicle 100 by a charging controller 105. The charging controller 105 may to this end be configured so as to communicate for example wirelessly (for instance via WLAN) with the WPT base unit 110.

To be able to produce the greatest possible field strengths of the magnetic charging field in order to bridge the underbody clearance 130, use may be made of resonant systems. In this case, both the primary coil 111 and the secondary coil 121 are incorporated into resonant circuits that are coupled to one another by way of the primary coil 111 and the secondary coil 121. In particular, in this case, relatively high primary currents are used to generate a magnetic charging field with sufficient field strength in a primary resonant circuit of the WPT base unit 110, due to a relatively low coupling factor between the primary coil 111 and the secondary coil 121.

Structurally identical secondary units 120 may be installed in various types of vehicle (for example limousines, SUVs, etc.) and, due to the different structure of the different types of vehicle, have very different coupling properties with respect to a primary unit 110. Furthermore, different primary units 110 and/or secondary units 120 having different coupling properties may be provided by different manufacturers.

The present disclosure deals with the technical problem of providing a method and an evaluation unit by way of which the interoperability between different pairs of primary units and secondary units is able to be ensured in an efficient and reliable manner.

According to one aspect, a method for checking a test secondary unit of an inductive test charging system for charging an electrical energy store is described. The test charging system comprises the test secondary unit having a test secondary coil and a reference primary unit having a reference primary coil. The reference primary coil is in this case able to generate a magnetic charging field that induces a current in the test secondary coil, such that electrical energy is able to be transferred from the reference primary unit to the test secondary unit. The reference primary unit may be part of a reference charging system having the reference primary unit and a reference secondary unit having a reference secondary coil.

The test charging system may be configured so as to regulate an actual charging power for charging the energy store to a setpoint charging power. For this purpose, there may be feedback from the secondary unit to the primary unit (for example via wireless communication), in order to provide a control loop for regulating the actual charging power. The regulation may be performed by a charging controller.

The method comprises recording a plurality of (complex-value) actual primary unit impedance values of the test charging system at the reference primary coil for a corresponding plurality of test combinations of values of operating parameters of the test charging system. The operating parameters comprise for example a charging voltage at the energy store (by way of which the energy store is charged). The charging voltage may be varied in a reference voltage range, that is to say the charging voltage may adopt any desired values from a reference voltage range. The operating parameters may furthermore comprise a setpoint charging power for charging the energy store. In this case, the setpoint charging power may adopt any desired values from a reference power range. The reference charging power may in this case be divided into different partial ranges (for example into a WPT1 partial range, a WPT2 partial range and a WPT3 partial range). The operating parameters may furthermore comprise an offset position between the test secondary coil and the reference primary coil. The offset position may in this case be varied in two or three dimensions within a reference offset range.

It is thus possible to set different test combinations of values of operating parameters, and the actual primary unit impedance value in each case resulting therefrom is able to be measured. The test combinations of values may in this case be situated in a reference operating range that results from the combination of the reference power range, of the reference voltage range and/or of the reference offset range. In particular, representative test combinations of values of the operating parameters may be selected as random samples, such that the reference operating range is covered as comprehensively as possible.

The method furthermore comprises comparing the plurality of actual primary unit impedance values with a reference value range for the primary unit impedance. In this case, the reference value range for the primary unit impedance may indicate the actual primary unit impedance values that result when the reference charging system is operated with combinations of values of the operating parameters from the entire reference operating range. In other words, the reference value range for the primary unit impedance may indicate actual primary unit impedance values of the reference charging system for a plurality of reference combinations of values of the operating parameters (in particular of reference combinations of values from the entire reference operating range).

The determination of actual primary unit impedance values and the taking into account of a reference value range for the primary unit impedance makes it possible to check the interoperability of a test secondary unit in a charging system in an efficient and reliable manner.

The operating parameters may in particular comprise the setpoint charging power of the energy store and/or the charging voltage at the energy store. The reference value range for the primary unit impedance may then depend on actual secondary unit impedance values at the reference secondary coil for different values of the setpoint charging power and/or of the charging voltage. In other words, in the context of the operation of a reference charging system, actual secondary unit impedance values may in each case be measured at the reference secondary coil for different values of the setpoint charging power and/or of the charging voltage. If the setpoint charging power and/or the charging voltage is varied in the entire reference operating range, then it is thus possible to determine a reference value range for the secondary unit impedance. The reference value range for the primary unit impedance may then depend on the reference value range for the secondary unit impedance (for example by way of a coupling formula for the coupling between the reference primary coil and the reference secondary coil). A reference value range for the primary unit impedance is thus able to be provided in an efficient and precise manner.

The operating parameters may comprise an offset position between the reference secondary coil and the reference primary coil, the offset position being able to be varied within a reference offset range. The reference value range for the primary unit impedance may then depend on a reference value range for coupling parameters of the coupling system consisting of the reference secondary coil and the reference primary coil.

The coupling parameters may comprise for example parameters of an equivalent circuit diagram, in particular of a T equivalent circuit diagram, of the reference secondary coil and of the reference primary coil. In particular, the coupling parameters may be a primary leakage inductance ($L_1$–M), a secondary leakage inductance ($L_2$–M) and/or a mutual inductance (M). A value of the reference value range for coupling parameters may then comprise a possible value tuple of the plurality of different coupling parameters.

The offset position may be varied within the entire reference offset range. This results in different value tuples of the plurality of different coupling parameters. The point cloud of all of the measured value tuples then gives the reference value range for coupling parameters of the coupling system between the reference primary coil and the reference secondary coil. Furthermore, the reference value range may be expanded with respect to the measured value tuples in order to take into account tolerances (for example measurement tolerances). By taking into account a reference value range for coupling parameters, the reference value range for the primary unit impedance is able to be provided in a precise and efficient manner.

The reference value range for the primary unit impedance may comprise a plurality of primary unit impedance values for a single secondary unit impedance value (from the reference value range for the secondary unit impedance). In this case, the plurality of primary unit impedance values may be calculated from the secondary unit impedance value by way of a coupling formula. The coupling formula is given for example by:

$$Z_{GA} = \frac{j\omega M(j\omega L_{\sigma_2} + Z_{VA})}{j\omega M + j\omega L_{\sigma_2} + Z_{VA}} + j\omega L_{\sigma_1}$$

wherein $Z_{GA}$ is a primary unit impedance value, wherein $Z_{VA}$ is a secondary unit impedance value, wherein $L_{\sigma^1}$ is the primary leakage inductance and wherein $L_{\sigma^2}$ is the secondary leakage inductance. The coupling formula may thus be dependent on the coupling parameters.

Using the coupling formula and using the possible value tuples of the coupling parameters from the reference value range for coupling parameters, a plurality of different primary unit impedance values may thus be determined for a secondary unit impedance value. The coupling parameters may thus adopt a corresponding plurality of value tuples from the reference value range for coupling parameters for the plurality of primary unit impedance values. By taking into account a coupling formula, the reference value range for the primary unit impedance is able to be determined in a precise and efficient manner.

According to a further aspect, a method for checking a test primary unit of an inductive test charging system for charging an electrical energy store is described. The aspects, set forth in this document, in relation to a test charging system accordingly apply to the method for checking a test primary unit. The test charging system comprises the test primary unit having a test primary coil and a reference secondary unit having a reference secondary coil.

The method comprises setting a plurality of different actual secondary unit impedance values of a secondary unit impedance at the reference secondary coil. In this case, the actual secondary unit impedance values are values from a reference value range for the secondary unit impedance. It is in particular possible to set actual secondary unit impedance values that ensure that the entire reference value range for the secondary unit impedance is covered. The reference value range for the secondary unit impedance may in this case have been determined by way of a reference charging system (as set forth in this document). Furthermore, the reference value range for the secondary unit impedance may depend on the setpoint charging power and/or the charging voltage by way of which the test charging system is operated.

The method furthermore comprises checking whether an actual charging power of the energy store is able to be regulated to a setpoint charging power for the plurality of different actual secondary unit impedance values. In other words, it is able to be determined whether a particular setpoint charging power is able to be transferred at the output of the secondary unit for the different actual secondary unit impedance values (and is able to be provided for example as DC charging power). Efficient and reliable checking of the interoperability of the test primary unit is thus made possible.

The checking may be performed for different setpoint charging powers from a reference power range. As an alternative or in addition, the checking may be performed for different offset positions from a reference offset range between the reference secondary coil and the test primary coil. As an alternative or in addition, the checking may be performed for different charging voltages from a reference voltage range. The test primary unit is thus able to be checked in the entire reference operating range.

According to a further aspect, an evaluation unit or a test bench is described, which evaluation unit or test bench is configured so as to execute the methods described in this document.

According to a further aspect, a software (SW) program is described. The SW program may be configured so as to be executed on a processor, and so as thereby to execute one of the methods described in this document.

According to a further aspect, a storage medium is described. The storage medium may comprise an SW program that is configured so as to be executed on a processor, and so as thereby to execute one of the methods described in this document.

It should be borne in mind that the methods, devices and systems described in this document are able to be used both on their own and in combination with other methods, devices and systems described in this document. Furthermore, any aspects of the methods, devices and systems described in this document may be combined with one another in a wide variety of ways. In particular, the features of the claims may be combined with one another in a wide variety of ways.

The invention is described in more detail below with reference to exemplary embodiments, in which Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
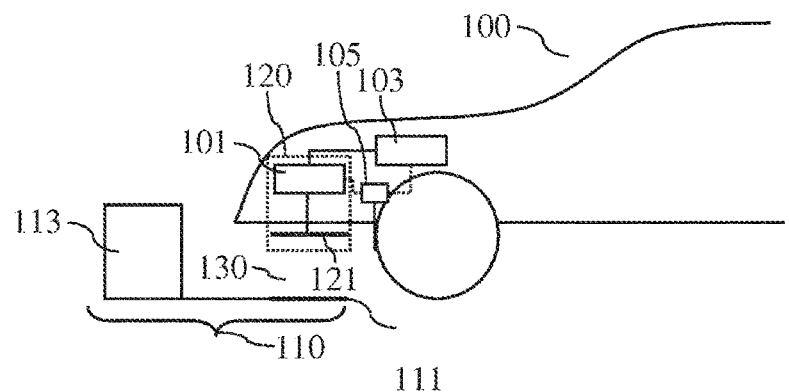
FIG. 1 shows exemplary components of an inductive charging system.

As set forth at the outset, the present document deals with testing the interoperability between a WPT base unit (or a primary unit) 110 and a WPT vehicle unit (or a secondary unit) 120 in an efficient and reliable manner. It should be taken into account in this case that an inductive charging system consisting of a primary unit 110 and a secondary unit 120

- is able to be operated with different charging powers P from a reference power range (for example between 0 kW and 12 kW);
- is able to be operated with different charging voltages from a reference voltage range at the energy store 103 of the vehicle 100 (for example between 300 and 400 V);
- is able to be operated with different charging field frequencies from a reference frequency range (for example between 80 kHz and 90 kHz); and/or
- is able to be operated with a different spatial offset between the primary coil 111 and the secondary coil 121 (for example with different offset positions from a reference offset range), and therefore with different coupling parameters.

A particular reference operating range thus results for the inductive charging system, which reference operating range is able to be described by the abovementioned parameters and their reference parameter ranges. An interoperability test is intended to ensure, in an efficient and reliable manner, that a test secondary unit 120 to be tested achieves a predefined minimum efficiency with all of the qualified or permitted (reference) primary units 110 in the defined reference operating range, or that a test primary unit 110 to be tested achieves the predefined minimum efficiency with all of the qualified or permitted (reference) secondary units 120 in the defined reference operating range.

Figure 2:
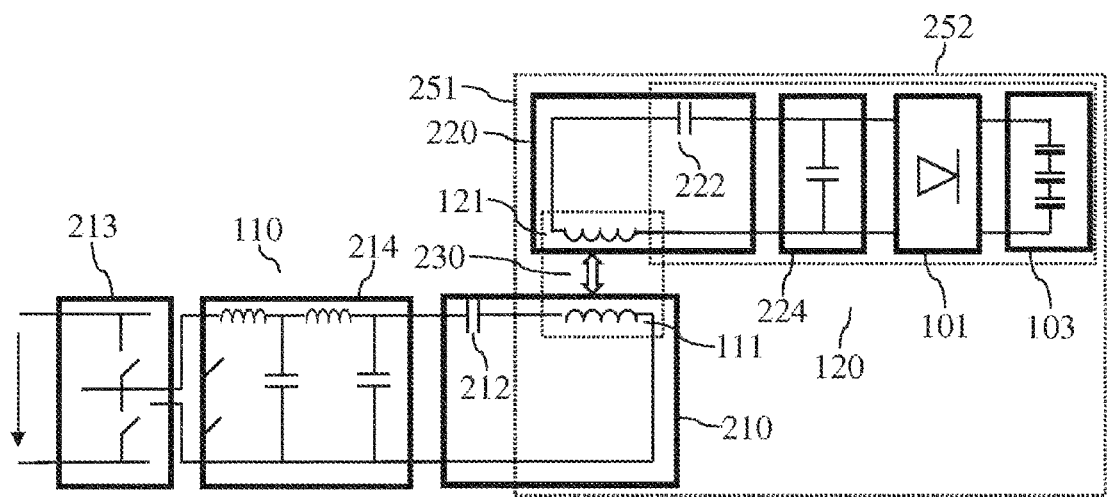
FIG. 2 shows exemplary components of a WPT base unit and of a WPT vehicle unit.

FIG. 2 shows a circuit diagram of an exemplary WPT base unit 110 (as an example of a primary unit) and of an exemplary WPT vehicle unit 120 (as an example of a secondary unit). The WPT base unit 110 comprises an inverter 213 that is configured so as to generate an AC current at a charging field frequency from a DC current (for example at a DC voltage of around 500 V). The WPT base unit 110 furthermore comprises the primary coil 111 and a primary capacitor 212. FIG. 2 furthermore illustrates, by way of example, a filter 214 of the WPT base unit 110. The WPT base unit 110 thus comprises a series resonant circuit (also referred to as primary resonant circuit here), whose resonant frequency results as $$f_0 = \frac{1}{2\pi\sqrt{LC}}$$

from the overall capacitance C (in particular the capacitance of the capacitor 212) and the overall inductance L (in particular the inductance of the primary coil 111). The charging field frequency is preferably close to the resonant frequency $f_0$, in order to generate a primary current that is as high as possible through the primary coil 111 (through a resonance). A high primary current is typically required as the coupling factor k 230 between the primary coil 111 and the secondary coil 121 is relatively small, for example k~0.1, due to the large air gap 130.

In the same way, the WPT vehicle unit 120 comprises a resonant circuit (also referred to as secondary resonant circuit here) that is formed from the secondary coil 121 and a secondary capacitor 222. The resonant frequency of this secondary resonant circuit is preferably matched to the resonant frequency of the primary resonant circuit of the WPT base unit 110 in order to achieve an energy transfer that is as good as possible. FIG. 2 furthermore illustrates a filter capacitor 224, a rectifier 101 and an energy store 103 to be charged.

The effective inductances $L_1$, $L_2$ of the primary coil 111 and of the secondary coil 121 depend on the arrangement of the primary coil 111 in relation to the secondary coil 121. In particular, the effective inductance $L_1$ of the primary coil 111 or the effective inductance $L_2$ of the secondary coil 121 depend on the magnitude of the underbody clearance 130 and/or on a transverse offset of the primary coil 111 with respect to the secondary coil 121. A changing effective inductance leads to a changing resonant frequency of the primary resonant circuit. The driving of the primary coil 111 should accordingly be adjusted for optimum energy efficiency. In this case, it is in particular possible to adjust the charging field frequency, to adjust a matching network (for example the filter 214) and/or to adjust the voltages.

Figure 3A:
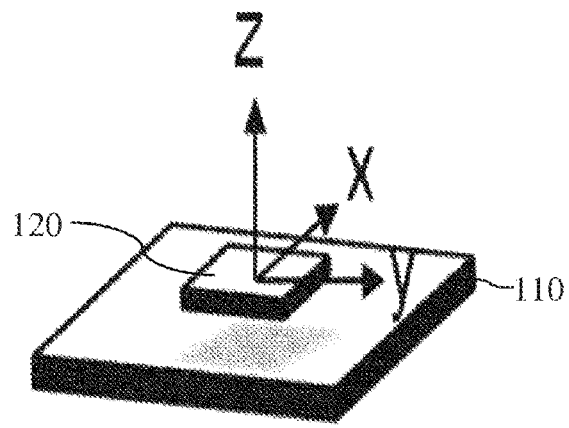
FIG. 3a shows an exemplary inductive coupling system.

The relative positioning, in particular an offset position, between the primary coil 111 and the secondary coil 121 may be described for example by Cartesian coordinates X, Y, Z, as in FIG. 3a. In this case, the Z coordinate indicates the magnitude of the underbody clearance 130. The X and Y coordinates describe the transverse offset of the primary coil 111 with respect to the secondary coil 121.

Figure 3B:
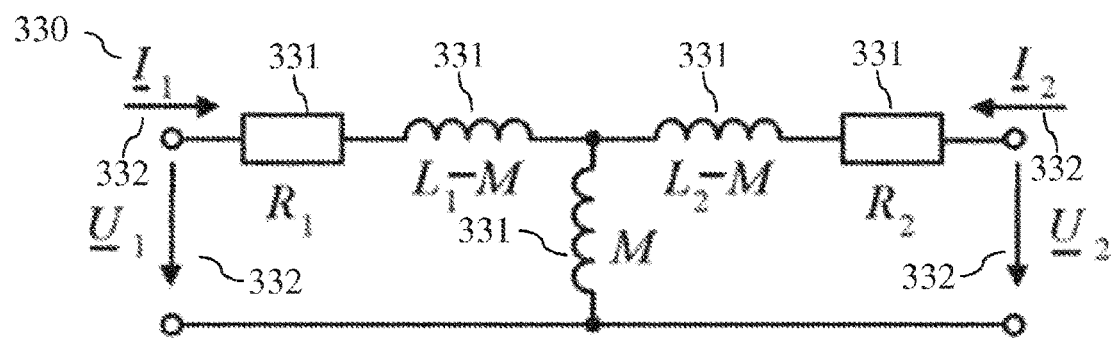
FIG. 3b shows an exemplary model of an inductive coupling system.

The inductive coupling system between the primary coil 111 and the secondary coil 121 may be described or modeled for example by a T equivalent circuit diagram (see FIG. 3b). This model 330 has, as parameters 331, the effective inductance $L_1$ of the primary coil 111, the effective inductance $L_2$ of the secondary coil 121 and the coupling factor k (with the mutual inductance M=k· $\sqrt{L_1 L_2}$) The parameters $L_1$, $L_2$, M 331 are in this case functions of the relative position between the primary coil 111 and the secondary coil 121, that is to say functions of x, y, z.

Figure 3C:
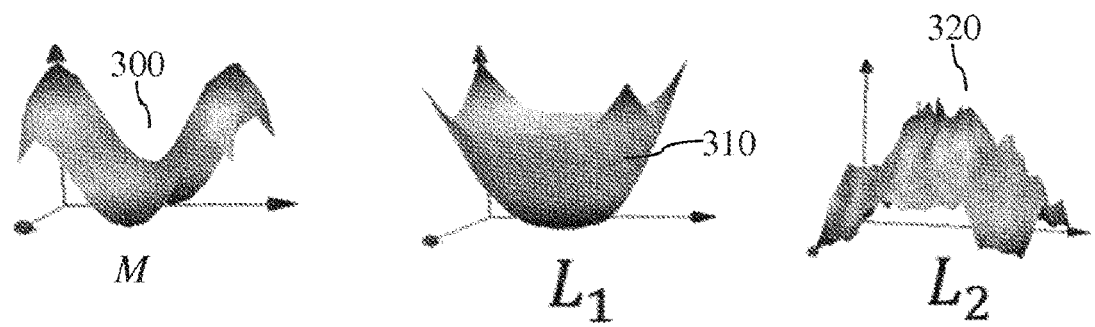
FIG. 3c shows exemplary parameter profiles of the coupling parameters of an inductive coupling system.
Figure 3D:
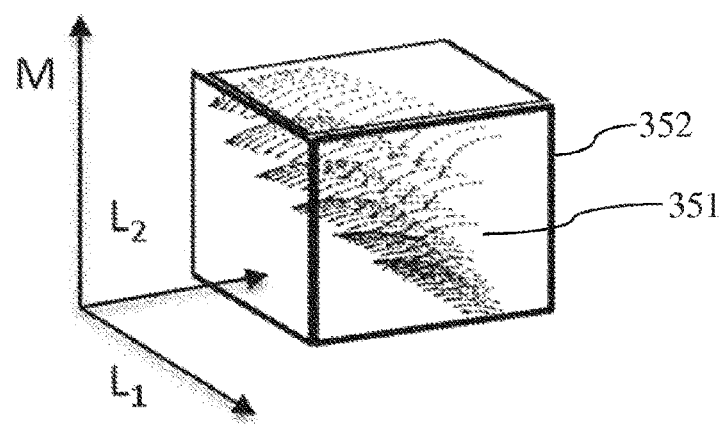
FIG. 3d shows an exemplary reference value range for coupling parameters.

FIG. 3c shows exemplary profiles/characteristic diagrams 300, 310, 320 for the parameters M, $L_1$, $L_2$ 331. These profiles/characteristic diagrams 300, 310, 320 may be determined in advance for a particular inductive coupling system.

In particular, profiles 300, 310, 320 for the parameters M, $L_1$, $L_2$ 331 may be measured for a particular combination of reference base unit 110 and reference vehicle unit 120. Reference characteristic diagrams M(x,y,z) 300, $L_1$(x,y,z) 310 and $L_2$(x,y,z) 320 may thus be determined for the coupling parameters 331. These reference characteristic diagrams 300, 310, 320 may be determined for one or more combinations consisting in each case of a reference base unit 110 and of in each case a reference vehicle unit 120.

The reference characteristic diagrams 300, 310, 320 for one or more combinations of reference base units 110/ reference vehicle units 120 may be combined into a reference characteristic diagram 351 that indicates possible value tuples of the coupling parameters M, $L_1$, $L_2$ 331. A value tuple in this case results from the parameter values M(x,y,z), $L_1$(x,y,z) and $L_2$(x,y,z) for a particular offset position x,y,z. For a plurality of offset positions and possibly for a plurality of combinations of reference base units 110/reference vehicle units 120, this then results in a plurality of value tuples that are able to be combined so as to form a reference characteristic diagram 351.

From the reference characteristic diagram 351 for possible combinations of values of the coupling parameters M, $L_1$, $L_2$ 331, it is then possible to determine a reference value range 352 for the coupling parameters 331 of the inductive coupling system between the primary coil 111 and the secondary coil 121. The reference value range 352 in this case indicates which combinations of values of the coupling parameters M, $L_1$, $L_2$ 331 are permissible for different offset positions between the primary coil 111 and the secondary coil 121. The reference value range 352 may possibly be increased by a particular tolerance value (for example of 3%, 5% or more) with respect to the reference characteristic diagram 351, in order for example to take into account production tolerances and influences from surrounding vehicle structures.

FIG. 2 defines different impedances in an inductive charging system. FIG. 2 in particular defines a secondary unit impedance $Z_{VA}$ 252 that results at the secondary coil 121. FIG. 2 furthermore defines a primary unit impedance $Z_{GA}$ 251 that results at the primary coil 111. The primary impedance $Z_{GA}$ 251 may in this case be calculated from the secondary unit impedance $Z_{VA}$ 252 via the coupling properties of the coils 111, 121. The following coupling formula may in particular be used for this purpose:

$$Z_{GA} = \frac{j\omega M(j\omega L_{\sigma_2} + Z_{VA})}{j\omega M + j\omega L_{\sigma_2} + Z_{VA}} + j\omega L_{\sigma_1}$$

wherein $L_\sigma{}^1$=L1−M and $L_\sigma{}^2$=L2−M are the leakage inductances of the coupling system.

Figure 3E:
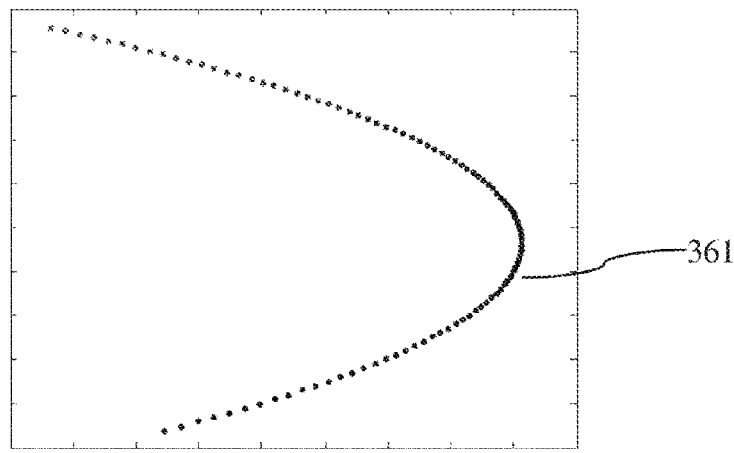
FIG. 3e shows an exemplary reference value range for the secondary unit impedance.

Possible secondary unit impedances $Z_{VA}$ 252 may be determined for one or more combinations of reference base units 110/reference vehicle units 120 (for different charging powers and/or for different charging voltages) in order to determine a reference characteristic diagram for the secondary unit impedances $Z_{VA}$ 252. FIG. 3e shows an exemplary reference value range 361 for the secondary unit impedance $Z_{VA}$ 252 (for a fixed charging power and for different charging voltages).

Figure 3F:
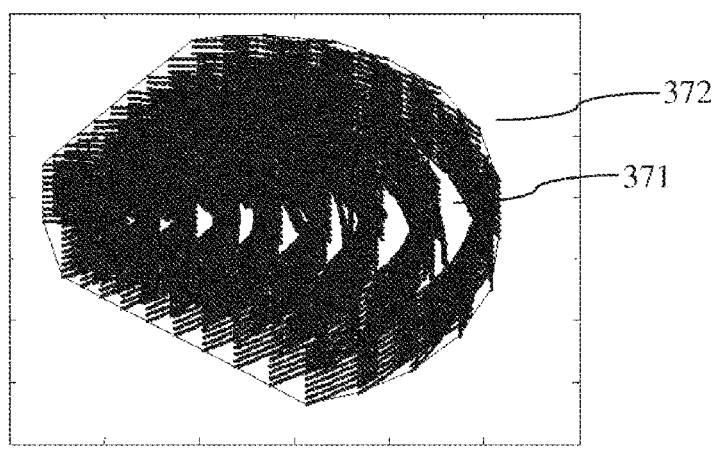
FIG. 3f shows an exemplary reference value range for the primary unit impedance.

The reference value range 361 for the secondary unit impedance $Z_{VA}$ 252 may then be transferred into a reference characteristic diagram 371 for the primary unit impedance $Z_{GA}$ 251 (for example by way of the abovementioned formula). In this case, all of the possible value tuples from the reference characteristic diagram 351 for possible combinations of values of the coupling parameters M, $L_1$, $L_2$ 331 may be taken into account. A reference characteristic diagram 371 for the primary unit impedance $Z_{GA}$ 251 may thus be determined for different charging voltages, for different charging powers and/or for different offset positions (see FIG. 3f). Furthermore, in the case of using the reference value range 352 (expanded by a tolerance range) for possible combinations of values of the coupling parameters M, $L_1$, $L_2$ 331, a reference value range 372 for the primary unit impedance $Z_{GA}$ 251 may be determined in the conversion of the secondary unit impedance values into the primary unit impedance values.

Figure 4A:
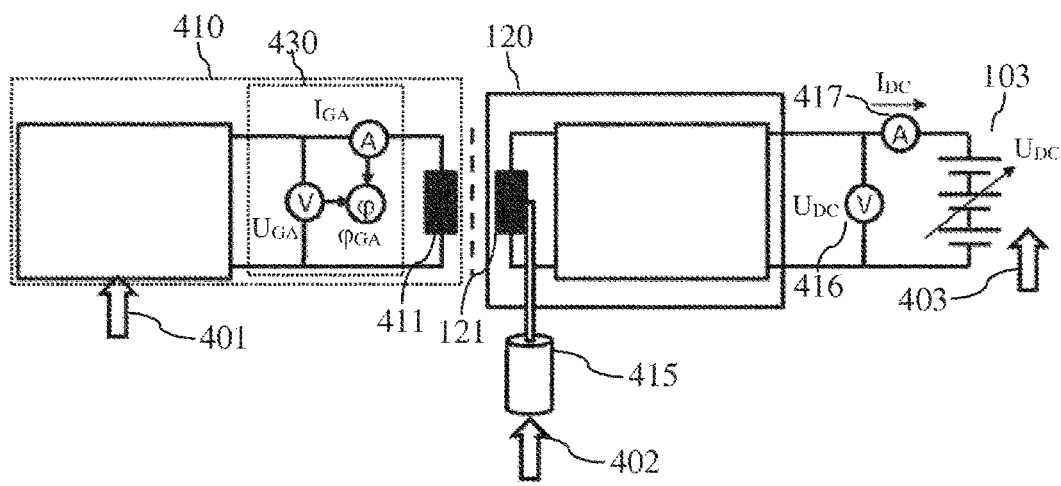
FIG. 4a shows an exemplary test bench for checking a test secondary unit.

To check a test vehicle unit 120, the test vehicle unit 120 may be tested in combination with a reference base unit 410 (see FIG. 4a). On the other hand, to check a test base unit 110, the test base unit 110 may be tested in combination with a reference vehicle unit 420 (see FIG. 4b). In this case, different offset positions 402 between the primary coil 411, 111 and the secondary coil 121, 421 may be set for a test. The different offset positions 402 may possibly be set automatically by a setting unit 415.

To test a test vehicle unit 120 (see FIG. 4a), the energy store 103 of the vehicle 100 may be charged with a particular charging voltage $U_{DC}$ 403. The charging voltage 403 may be measured using a voltage measurement unit 416. The charging current $I_{DC}$ may furthermore be measured using a current measurement unit 417. The actual charging power then results from the charging voltage and the charging current. The setpoint charging power 401 may furthermore be predefined at the reference base unit 410. The test vehicle unit 120 and the reference base unit 410 are then able to regulate the actual charging power to the setpoint charging power 401 using a control loop.

The test combination consisting of the test vehicle unit 120 and the reference base unit 410 (see FIG. 4a) may then be operated with
  different charging voltages 403 from the reference voltage range;
  different offset positions 402 from the reference offset range; and/or
  different setpoint charging powers 401 from the reference power range.

In this case, a (complex-value) actual primary unit impedance value may be measured at the reference primary coil 411 for a particular operating point (defined by a particular combination of the values of the operating parameters 401, 402, 403) by way of an impedance measurement unit 430. The impedance measurement unit 403 (for example an impedance analyzer) may in this case for example record the magnitude of the voltage $U_{GA}$ at the reference primary coil 411, the magnitude of the current IGA through the reference primary coil 411 and a phase shift $\varphi_{GA}$ between the voltage and the current.

It is thus possible to determine actual primary unit impedance values for an operating range defined by different charging voltages 403, offset positions 402 and/or setpoint charging powers 401. The actual primary unit impedance values determined in this way may then be compared with the reference value range 372 for the primary unit impedances $Z_{GA}$ 251. It is in particular able to be checked whether all of the determined actual primary unit impedance values are situated within the reference value range 372. If this is the case, then the test vehicle unit 120 may be activated. If not, it may be necessary to correct the test vehicle unit 120.

The interoperability between a test vehicle unit 120 and different base units 110 is thus able to be ensured in an efficient and precise manner.

Figure 4B:
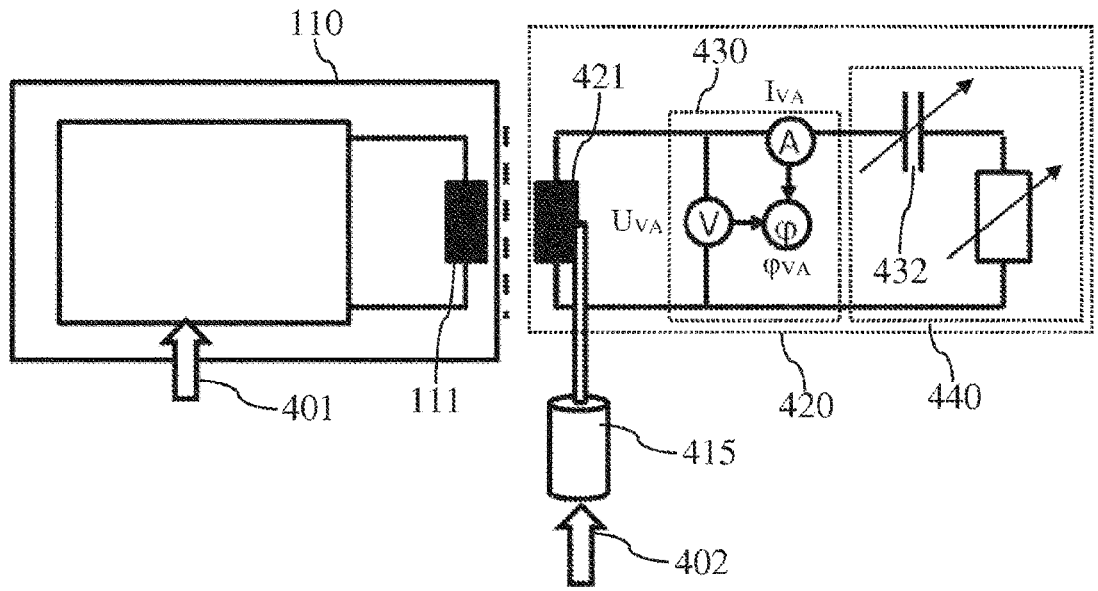
FIG. 4b shows an exemplary test bench for checking a test primary unit.

To test a test base unit 110, as illustrated in FIG. 4b, it is possible to set different secondary unit impedance values by way of an impedance setting unit 440, which secondary unit impedance values are in turn able to be measured by way of an impedance measurement unit 430. In this case, all of the possible secondary unit impedance values from the reference value range 361 for the secondary unit impedance $Z_{VA}$ 252 are able to be set by way of the impedance setting unit 440. In the example illustrated in FIG. 4b, the impedance setting unit 440 comprises a settable capacitor and a settable resistor.

The test base unit 110 may be operated with different setpoint charging powers 401. It is then able to be determined (for different offset positions 402) whether the respective setpoint charging power 401 is able to be provided at the output of the secondary coil 421 of the reference vehicle unit 420. The interoperability of a test base unit 110 is thus able to be checked in an efficient and reliable manner.

FIG. 4a thus shows a test bench for checking a secondary system, that is to say a test secondary unit 120. The secondary system 120 to be tested is operated with a reference primary coil 411 on the test bench, and in the process a setpoint charging power 401 that is intended to be output on the secondary side, for example to an energy store 103, is set. The setpoint charging power 401 may in this case be subsequently adjusted. The DC charging voltage 403 may be set to a particular value on the secondary side. Furthermore, the relative distance (that is to say the offset position 402) may be varied in a particular reference offset range. It is able to be checked, as interoperability criterion, whether the primary unit impedance values on the reference primary coil 411 are situated within the permitted impedance value range 372 for all of the tested operating points.

FIG. 4b shows a test bench for checking a primary system, that is to say a test primary unit 110. The primary system 110 is operated with a reference secondary coil 411 on the test bench. At the output of the reference secondary coil 411, the secondary unit impedance 252 is able to be varied in the entire impedance value range 361 via correspondingly settable elements of an impedance setting unit 440 (for example via a settable load resistor and/or via a settable capacitor). In this case, a capacitive load is typically always necessary in the impedance setting unit 440 due to the inductance of the coils. The relative distance, that is to say the offset position 402, may furthermore be varied. It is then able to be checked whether enough power is able to be transferred, for all operating points (that is to say for all secondary unit impedance values, for all offset positions 402 and/or for different setpoint charging powers 401), to regulate the actual charging power to the respective setpoint charging power 401.

If a design (that is to say a test secondary unit 120 or a test primary unit 110) is intended to interoperate with a plurality of reference designs, then the measurements on the test benches of FIGS. 4a and 4b may accordingly be tested with a plurality of reference counter-coils 411, 421. The respective interoperability conditions should then be met with all reference designs.

Figure 6:
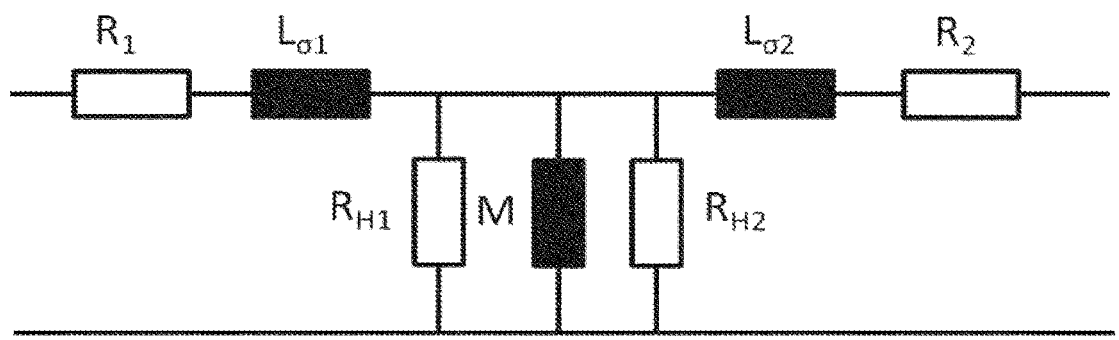
FIG. 6 shows an exemplary equivalent circuit diagram for determining losses in an inductive charging system.

Partial efficiencies of a charging system may also be determined in the context of the measurements. A charging system may be operated, and the input and output voltages of the charging system may be measured, together with the input power of the primary side and the DC output power of the secondary side. The losses within the charging system are able to be determined on the basis of these measured values. The proportional losses in the primary and secondary coil 111, 121 are furthermore able to be determined via the determined currents and voltages with the equivalent circuit from FIG. 6. This measurement may in each case be applied only to one side (primary or secondary) of the charging system.

By way of example, the current and the voltage may be measured at the input of the primary coil 111, 411 (for example by the impedance measurement unit 430 from FIG. 4a). Furthermore, the current and the voltage may be measured at the output of the secondary coil 121, 421 and/or at the input of the energy store 103 (for example by the voltage measurement unit 416 and the current measurement unit 417 from FIG. 4a). Furthermore, the power drawn from a supply grid by an inductive charging system may be determined. A model of the inductive coupling system (for example the model shown in FIG. 6) may also be taken into account. It is then able to be determined what proportion of losses arises on the primary side of the coupling system and what proportion of losses arises on the secondary side of the coupling system. The power loss of the secondary side of the coupling system is in particular able to be determined for example using the test bench from FIG. 4a.

Figure 5A:
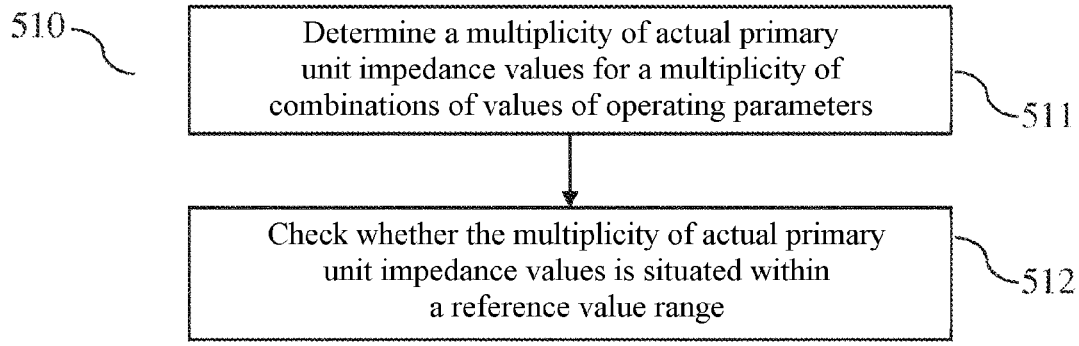
FIG. 5a shows a flowchart of an exemplary method for checking a test secondary unit.

FIG. 5a shows a flowchart of an exemplary method 510 for checking a test secondary unit 120 of an inductive test charging system for charging an electrical energy store 103. The test charging system in this case comprises the test secondary unit 120 (for example a vehicle unit) having a test secondary coil 121 and a reference primary unit 410 (for example a base unit) having a reference primary coil 411. The test secondary unit 120 in this case comprises all of the components (for example vehicle parts and bodywork parts) influencing the transfer behavior of the magnetic coupling system. The reference primary unit 410 accordingly also comprises all of the components (for example a coil cover) influencing the transfer behavior of the magnetic coupling system. The method 510 may be performed automatically. In particular, operating parameters 401, 402, 403 of the test charging system, in particular the setpoint charging power 401, the offset position 402 between the test secondary coil 421 and the reference primary coil 111 and/or the charging voltage 403, may be varied automatically in order to test the test secondary unit 120 in a particular predefined reference operating range.

The method 510 comprises recording 511 a plurality of actual primary unit impedance values of the test charging system at the reference primary coil 411 for a corresponding plurality of test combinations of values of operating parameters 401, 402, 403 of the test charging system. As set forth above, the operating parameters 401, 402, 403 may in this case be at least partly varied automatically. A corresponding actual primary unit impedance value may be measured at the reference primary coil 411 for each test combination of values of the operating parameters 401, 402, 403. In this case, test combinations may be (randomly) considered from the entire reference operating range. The actual primary unit impedance values may be measured using an impedance measurement unit 430.

The method 510 furthermore comprises comparing 512 the plurality of actual primary unit impedance values with a reference value range 372 for the primary unit impedance 251. The reference value range 372 may in this case have been determined on the basis of one or more reference charging systems. In this case, the reference value range 372 for the primary unit impedance 251 may indicate the actual primary unit impedance values that are present in the one or more reference charging systems at the respective reference primary coil 411. The reference value range 372 for the primary unit impedance 251 may in particular indicate the actual primary unit impedance values of the one or more reference charging systems for the entire reference operating range.

It is able to be checked whether the plurality of actual primary unit impedance values are all, or in more than X % of the cases (for example X equal to 90 or more), situated within the reference value range 372 for the primary unit impedance 251. If this is the case, it is thus able to be determined that the test secondary unit 120 is interoperable. On the other hand, it may be determined that the test secondary unit 120 is not interoperable.

Figure 5B:
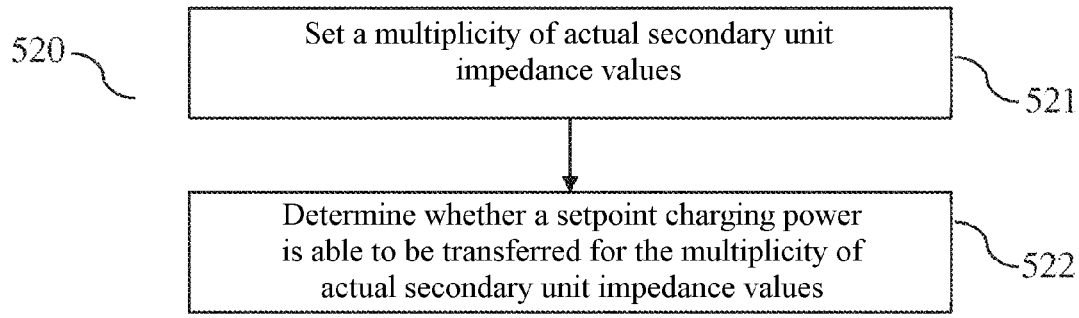
FIG. 5b shows a flowchart of an exemplary method for checking a test primary unit.

FIG. 5b shows a flowchart of an exemplary method 520 for checking a test primary unit 110 of an inductive test charging system for charging an electrical energy store 103. In this case, the test charging system comprises the test primary unit 110 having a test primary coil 111 and a reference secondary unit 420 having a reference secondary coil 421. The test primary unit 110 comprises all of the components (for example a coil cover) influencing the transfer behavior of the magnetic coupling system. The reference secondary unit 420 accordingly comprises all of the components (for example bodywork parts of a vehicle 100) influencing the transfer behavior of the magnetic coupling system.

The method 520 comprises setting 521 a plurality of different actual secondary unit impedance values of a secondary unit impedance 252 at the reference secondary coil 421. In this case, the actual secondary unit impedance values are situated within a reference value range 361 for the secondary unit impedance 252. The reference value range 361 for the secondary unit impedance 252 may indicate which actual secondary unit impedance values a reference charging system has during operation within the entire reference operating range (that is to say for all of the possible combinations of values of operating parameters 401, 402, 403). The different actual secondary unit impedance values may be set by way of an impedance setting unit 440.

The method 520 furthermore comprises checking 522 whether an actual charging power of the energy store 103 is able to be regulated to a setpoint charging power 401 for the plurality of different actual secondary unit impedance values. It is in particular able to be checked whether the respectively set setpoint power 401 is able to be transferred to the secondary unit 120 for the different actual secondary unit impedance values.

The checking 522 may in this case be performed for different setpoint charging powers 401 from a reference power range of the reference operating range. The checking 522 may furthermore be performed for different offset positions 402 between the reference secondary coil 421 and the test primary coil 111 from a reference offset range of the reference operating range. The reference value range 361 for the secondary unit impedance 252 may in this case be different for different setpoint charging powers 401 and/or for different offset positions 402. In other words, the reference value range 361 for the secondary unit impedance 252 may depend on an operating parameter 401, 402, 403 of the test charging system, in particular on the setpoint charging power 401, on the offset position 402 and/or on the charging voltage 403.

If the result of the checking 522 is that the setpoint charging power 401 in the reference power range is always, or in all cases or at least in X % of the cases (for example X equal to 90 or more), able to be provided as actual charging power, it is thus able to be determined that the test primary unit 110 is interoperable. As an alternative or in addition, a tolerance in relation to the reference power range may be taken into account when determining the interoperability (for example in connection with 100% delivery of the setpoint charging power 401). On the other hand, it may be determined that the test primary unit 110 is not interoperable.

By way of the measures described in this document, a test primary unit 110 or a test secondary unit 120 are able to be tested in an efficient manner in connection with a reference counter-unit 420, 410. In this case, it is possible to determine properties of the respective test unit 110, 120 (for example efficiency, influence of screening and metal parts, compliance with interoperability criteria). The development of primary units 110 or secondary units 120 is thus able to be simplified, since both partial systems 110, 120 are able to be developed independently of one another. The interoperability of primary units 110 or secondary units 120 is furthermore thus able to be tested in an efficient and reliable manner.

The present invention is not restricted to the disclosed exemplary embodiments. It should in particular be borne in mind that the description and the figures are intended only to elucidate the principle of the proposed methods, devices and systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for checking an interoperability of a WPT base unit and a WPT secondary unit, wherein the method comprises:
   providing a test charging system comprising:
      a reference secondary unit, having a reference secondary coil, as a proxy for the WPT secondary unit, and
      a test primary unit, having a test primary coil, as a proxy for the WPT base unit whose interoperability with the WPT secondary unit is being checked via the method;
   setting a plurality of actual impedance values of the reference secondary coil, wherein each of the plurality of actual impedance values of the reference secondary coil is within a reference value range;
   operating the test charging system so as to provide an actual charging power at the output of the reference secondary coil;
   measuring the actual charging power at the output of the reference secondary coil; and
   comparing the actual charging power to a setpoint charging power for each of the plurality of actual impedance values of the reference secondary coil, so as to determine the interoperability of the WPT base unit and the WPT secondary unit.

2. The method according to claim 1, wherein the test charging system is operated for, and the actual charging power is compared to, a plurality of different setpoint charging powers, each of the plurality of different setpoint charging powers being within a reference power range.

3. The method of claim 1, wherein the test charging system is operated for, and the actual charging power is compared for, a plurality of offset positions between the reference secondary coil and the test primary coil, each of the plurality of offset positions being within a reference offset range.

* * * * *